US 12,405,630 B2

(12) United States Patent
Lee et al.

(10) Patent No.: US 12,405,630 B2
(45) Date of Patent: Sep. 2, 2025

(54) DISPLAY APPARATUS

(71) Applicant: SAMSUNG ELECTRONICS CO., LTD., Suwon-si (KR)

(72) Inventors: Sanggoo Lee, Suwon-si (KR); Sunggi Kim, Suwon-si (KR); Daesik Park, Suwon-si (KR); Hyewon Song, Suwon-si (KR); Hyunwoong Yun, Suwon-si (KR); Jeongroh Lee, Suwon-si (KR); Woosung In, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 190 days.

(21) Appl. No.: 18/110,680

(22) Filed: Feb. 16, 2023

(65) Prior Publication Data

US 2023/0333589 A1    Oct. 19, 2023

Related U.S. Application Data

(63) Continuation of application No. PCT/KR2023/000872, filed on Jan. 18, 2023.

(30) Foreign Application Priority Data

Apr. 19, 2022  (KR) .................... 10-2022-0048029
May 18, 2022  (KR) .................... 10-2022-0060877

(51) Int. Cl.
    *G06F 1/16*      (2006.01)
    *F16M 11/08*    (2006.01)
    (Continued)

(52) U.S. Cl.
    CPC ........... *G06F 1/1607* (2013.01); *F16M 11/08* (2013.01); *F16M 11/105* (2013.01);
    (Continued)

(58) Field of Classification Search
    CPC ................ G06F 1/1601; G06F 1/1607; G06F 2200/161; G06F 2200/1612; H04N 5/655;
    (Continued)

(56) References Cited

U.S. PATENT DOCUMENTS 6,427,288 B1 *  8/2002  Saito .................... F16M 11/105
                                                        16/337
6,712,321 B1 *  3/2004  Su ........................ F16M 11/2064
                                                        248/917

(Continued)

FOREIGN PATENT DOCUMENTS

EP    1 855 045 A1   11/2007
EP    4 180 903 A1    5/2023
(Continued)

OTHER PUBLICATIONS

International Search Report dated May 16, 2023, issued by the International Searching Authority in International Application No. PCT/KR2023/000872 (PCT/ISA/210).
(Continued)

*Primary Examiner* — Allen L Parker
*Assistant Examiner* — Gage Crum
(74) *Attorney, Agent, or Firm* — Sughrue Mion, PLLC (57) ABSTRACT

A display apparatus is provided. The display apparatus includes: a display panel; a support bracket coupled to a rear surface of the display panel and defining a locking groove; a support arm coupled to the support bracket and supporting the display panel, wherein the support arm is configured to rotate between a first and second orientations; and a support stand supporting the support arm and configured to allow the support arm to move along a vertical direction between first and second positions. The support arm includes: a rotating link configured to rotate as the support arm moves; and a locking link configured to move from a locked position in
(Continued)

which the locking link is inserted into the locking groove to restrict rotation of the display panel, to an unlocked position in which the locking link is withdrawn from the locking groove to allow rotation of the display panel.

20 Claims, 11 Drawing Sheets

(51) Int. Cl.
*F16M 11/10* (2006.01)
*F16M 11/24* (2006.01)
(52) U.S. Cl.
CPC ........... *F16M 11/24* (2013.01); *G06F 1/1601* (2013.01); *G06F 2200/1612* (2013.01)
(58) Field of Classification Search
CPC ........ F16M 11/04; F16M 11/06; F16M 11/10; F16M 11/105; F16M 11/12; F16M 11/121; F16M 11/125
See application file for complete search history.

(56) References Cited

U.S. PATENT DOCUMENTS

| | | | |
|---|---|---|---|
| 7,448,580 B2* | 11/2008 | Shimizu | G09F 9/00 248/676 |
| 7,458,546 B2 | 12/2008 | Jang | |
| 7,490,796 B2* | 2/2009 | Kim | F16M 11/105 248/292.12 |
| 7,815,154 B2 | 10/2010 | Oh et al. | |
| 7,819,368 B2 | 10/2010 | Jung et al. | |
| 7,963,488 B2 | 6/2011 | Hasegawa et al. | |
| 9,791,095 B2* | 10/2017 | Chen | F16M 11/105 |
| 11,788,672 B2 | 10/2023 | Cho et al. | |
| 2004/0149873 A1* | 8/2004 | Ishizaki | F16M 11/2064 248/274.1 |
| 2005/0151043 A1 | 7/2005 | Kim et al. | |
| 2006/0175476 A1 | 8/2006 | Hasegawa et al. | |
| 2006/0219849 A1* | 10/2006 | Chiu | F16M 11/2021 248/917 |
| 2007/0064379 A1* | 3/2007 | Shin | F16M 11/2064 361/679.06 |
| 2007/0064380 A1* | 3/2007 | Shin | F16M 11/24 248/917 |
| 2007/0195495 A1* | 8/2007 | Kim | F16M 11/105 248/920 |
| 2007/0262210 A1* | 11/2007 | Oh | F16M 11/28 248/917 |
| 2020/0081483 A1* | 3/2020 | Laurent | F16M 11/10 |
| 2021/0315114 A1* | 10/2021 | Huang | F16M 11/24 |

FOREIGN PATENT DOCUMENTS

| | | |
|---|---|---|
| JP | 11-153960 A | 6/1999 |
| JP | 2014-41309 A | 3/2014 |
| JP | 2022-038717 A | 3/2022 |
| KR | 10-0435232 B1 | 6/2004 |
| KR | 100568219 B1 * | 10/2004 |
| KR | 10-0465798 B1 | 1/2005 |
| KR | 10-0520059 B1 | 10/2005 |
| KR | 10-0565686 B1 | 3/2006 |
| KR | 10-0671198 B1 | 1/2007 |
| KR | 10-2007-0109009 A | 11/2007 |
| KR | 10-0813716 B1 | 3/2008 |
| KR | 10-0813717 B1 | 3/2008 |
| KR | 10-0845863 B1 | 7/2008 |
| KR | 10-1253569 B1 | 4/2013 |
| KR | 10-1751055 B1 | 6/2017 |
| KR | 10-2021-0145933 A | 12/2021 |
| KR | 10-2022-0006263 A | 1/2022 |
| KR | 10-2022-0018845 A | 2/2022 |

OTHER PUBLICATIONS

Written Opinion dated May 16, 2023, issued by the International Searching Authority in International Application No. PCT/KR2023/000872 (PCT/ISA/237).
Communication dated February 7. 2025, issued by the European Patent Office in European Application No. 23791975.8.

* cited by examiner

DISPLAY APPARATUS

CROSS-REFERENCE TO RELATED APPLICATION(S)

This is a continuation of International Application No. PCT/KR2023/000872, filed on Jan. 18, 2023, which is based on and claims priority to Korean Patent Application No. 10-2022-0048029, filed on Apr. 19, 2022, in the Korean Intellectual Property Office, and Korean Patent Application No. 10-2022-0060877, filed on May 18, 2022, in the Korean Intellectual Property Office, the disclosures of which are incorporated herein by reference in their entireties.

BACKGROUND

1. Field

The disclosure relates to a display apparatus including a display module and a support device for supporting the display module to enable a rotation and an upward and downward movement of the display module.

2. Description of Related Art

A display apparatus is an output apparatus for converting acquired or stored electrical information into visual information and displaying the converted electrical information to a user.

The display apparatus may include a display module for displaying an image and a support device for supporting the display module. The support device may be provided to support the display module so that a front surface of the display module faces the user.

The support device may support the display module to be movable upward and downward within a predetermined range. In addition, the support device may support the display module to perform a pivot rotation.

When the display module is rotated without being sufficiently spaced apart from a floor surface, the display module may collide with the floor surface and thus the display module may be damaged.

SUMMARY

Provided is a display apparatus may prevent a display module from colliding with a floor surface due to being rotated.

Further, provided is a display apparatus includes a display module which is able to rotate with respect to a support device only when the display module is spaced apart from the floor surface by a predetermined distance or more.

Further still, provided is a display apparatus restricts rotation of a display module at a position having a possibility of colliding with a surface if rotated.

The technical objectives of the disclosure are not limited to the above, and other objectives may become apparent to those of ordinary skill in the art based on the following descriptions.

In accordance with an aspect of the disclosure, a display apparatus includes: a display panel; a support bracket coupled to a rear surface of the display panel and defining a locking groove; a support arm coupled to the support bracket and supporting the display panel, wherein the support arm is configured to rotate between a first orientation in which a long side of the display panel is laterally disposed and a second orientation in which the long side of the display panel is longitudinally disposed; and a support stand supporting the support arm and configured to allow the support arm to move along a vertical direction between a first position and a second position lower than the first position. The support arm includes: a rotating link configured to rotate in a first direction as the support arm moves from the second position to the first position; and a locking link configured to move from a locked position in which the locking link is inserted into the locking groove to restrict rotation of the display panel, to an unlocked position in which the locking link is withdrawn from the locking groove to allow rotation of the display panel, based on the rotating link rotating in the first direction.

The support arm may further include a fixing link coupled to the support stand.

The locking link may be configured to laterally move along a horizontal direction with respect to the fixing link, and the locking link may be inserted into the locking groove by moving toward the support bracket, and may be withdrawn from the locking groove by moving away from the support bracket.

The support arm may further include an elastic member configured to bias the locking link toward the support bracket.

One end of the elastic member may be connected to the fixing link, and another end of the elastic member may be connected to the locking link.

The locking link may be configured to move to the locked position based on an elastic force of the elastic member when the support arm moves from the first position to the second position.

The rotating link may be configured to rotate in a second direction opposite to the first direction based on the locking link moving from the unlocked position to the locked position.

The locking link may include: a locking portion configured to extend be inserted into the locking groove or withdrawn from the locking groove; and an extension portion extending toward the support stand and defining an insertion groove.

The rotating link may include: a first protrusion that is provided in into the insertion groove; and a second protrusion that extends into the support stand and is configured to rotate together with the first protrusion.

The support stand may include a rotation guide portion configured to contact the second protrusion and rotate the rotating link in the first direction as the support arm moves from the second position to the first position.

The rotation guide portion may be provided adjacent to an upper end of the support stand.

The rotation guide portion may include a rotation guide surface provided at an angle oblique to a horizontal direction, and the rotation guide surface may be configured to guide the second protrusion such that the second protrusion rotates in the first direction to be arranged in parallel with the rotation guide surface.

The support bracket may be detachably coupled to the rear surface of the display panel.

In accordance with an aspect of the disclosure, a display stand includes: a support bracket having a locking groove formed therein, and configured to support a display panel and rotate between a first orientation and a second orientation; a support arm configured to support the support bracket; and a support stand configured to slidably support the support arm between a first position and a second position lower than the first position. The support arm includes: a rotating link configured to rotate in a first direction as the support arm moves from the second position to the first position; and a locking link configured to move from a locked position in which the locking link is inserted into the locking groove to restrict rotation of the display panel, to an unlocked position in which the locking link is withdrawn from the locking groove to allow rotation of the display panel, based on the rotating link rotating in the first direction.

The support arm may be configured to move in a vertical direction between the first position and the second position, and the locking link may be configured to move along a horizontal direction that is perpendicular to the vertical direction between the locked position and the unlocked position.

The locking groove may be aligned with the locking link based on the support bracket being in the first orientation, and another locking groove may be formed in the support bracket and may be aligned with the locking link based on the support bracket being in the second orientation.

The support arm may further include a fixed portion, and the locking link may be configured to slide along the fixed portion in the horizontal direction.

The display stand may further include a spring connected between the fixed portion and the locking link, and configured to bias the locking link to the locked position.

In accordance with an aspect of the disclosure, a method of limiting rotation of a support bracket that is slidable along a support stand between a first position and a second position lower than the first position, includes: restricting rotation of the support bracket based on the support bracket being at the second position; sliding the support bracket from the second position to the first position; and withdrawing a locking link from a locking groove formed in the support bracket based on the support bracket sliding from to the first position.

A rotating link may extend into a groove formed in the locking link, and the method may further include rotating the rotating link in a first direction as the support bracket moves to the first position to move the locking link.

BRIEF DESCRIPTION OF DRAWINGS

The above and other aspects, features, and advantages of certain embodiments of the present disclosure will be more apparent from the following description, taken in conjunction with the accompanying drawings, in which.

DETAILED DESCRIPTION

Embodiments described in the specification and configurations shown in the accompanying drawings are provided as examples, and various modifications may replace the embodiments and the drawings of the disclosure at the time of filing of the application.

Further, identical symbols or numbers in the drawings of the disclosure denote components or elements configured to perform substantially identical functions.

Further, terms used herein are only for the purpose of describing particular embodiments and are not intended to limit to the disclosure. The singular form is intended to include the plural form as well, unless the context clearly indicates otherwise. It should be further understood that the terms "include," "including," "have," and/or "having" specify the presence of stated features, integers, steps, operations, elements, components, and/or groups thereof, but do not preclude the presence or addition of one or more other features, integers, steps, operations, elements, components, and/or groups thereof.

Further, it should be understood that, although the terms "first," "second," etc. may be used herein to describe various elements, the elements are not restricted by the terms, and the terms are only used to distinguish one element from another. For example, a first element could be termed a second element, and similarly, a second element could be termed a first element without departing from the scope of the disclosure. The term "and/or" includes combinations of one or all of a plurality of associated listed items.

The terms "front", "rear", "back", "left", "right", and the like as used herein are defined with respect to the drawings, but the terms may not restrict the shape and position of the respective components.

Hereinafter, embodiments will be described in detail with reference to the accompanying drawings.

Figure 1:
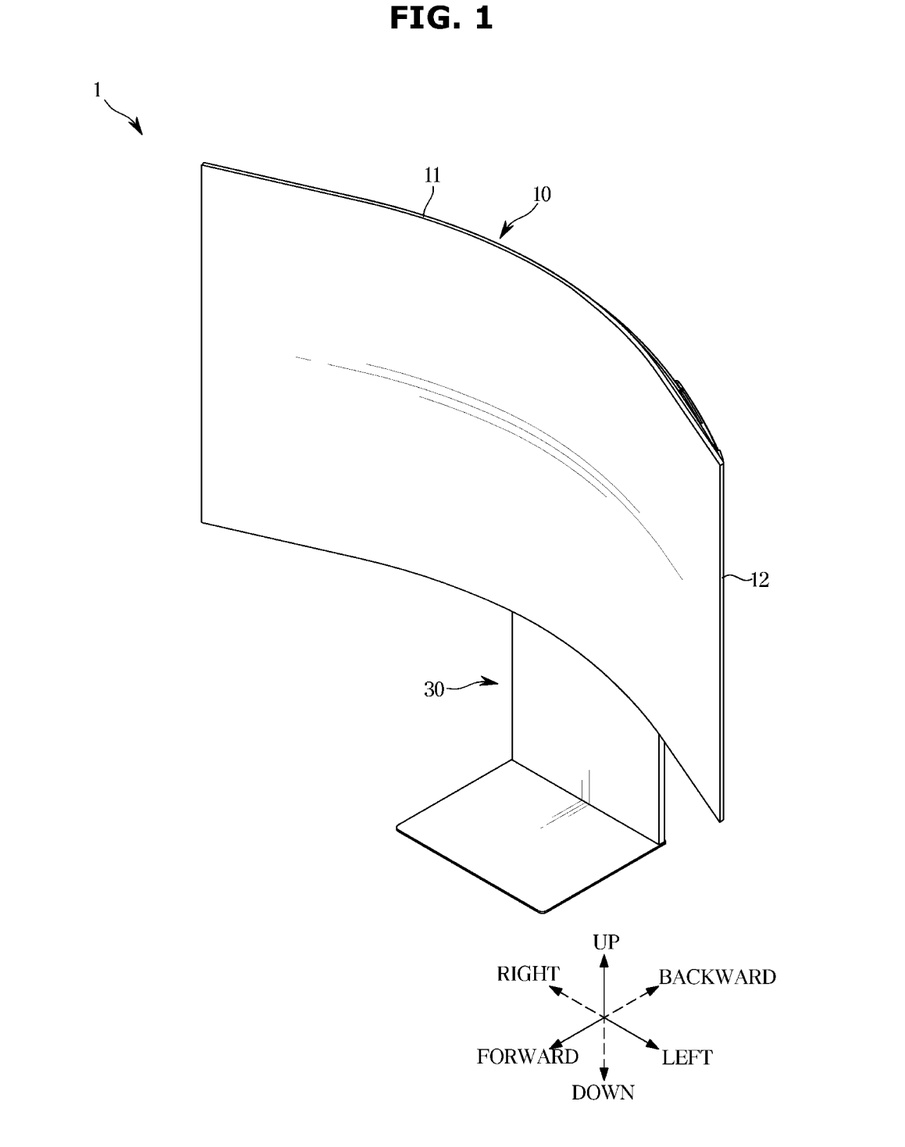
FIG. 1 is a perspective view illustrating a display apparatus according to an embodiment.
Figure 2:
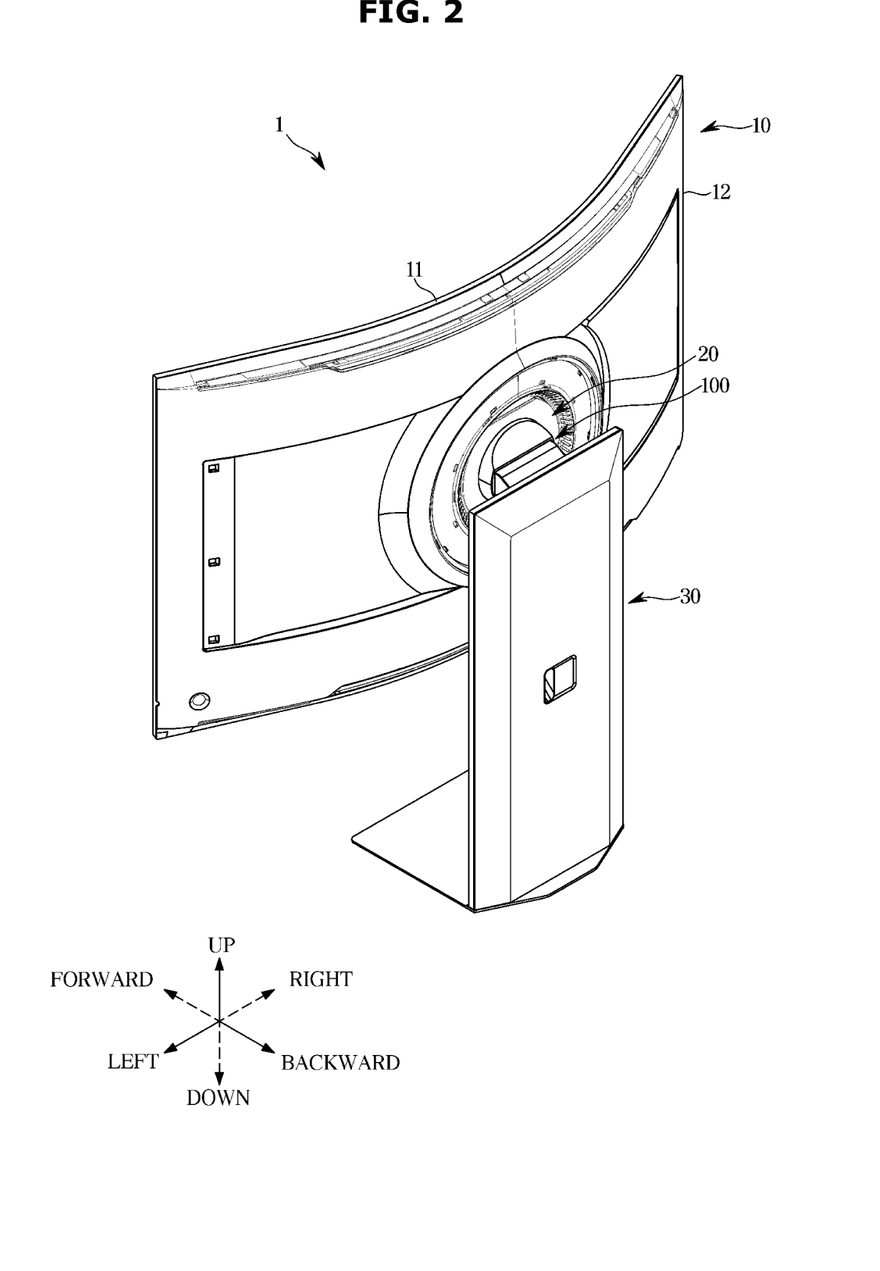
FIG. 2 is a rear perspective view illustrating the display apparatus shown in FIG. 1 according to an embodiment.
Figure 3:
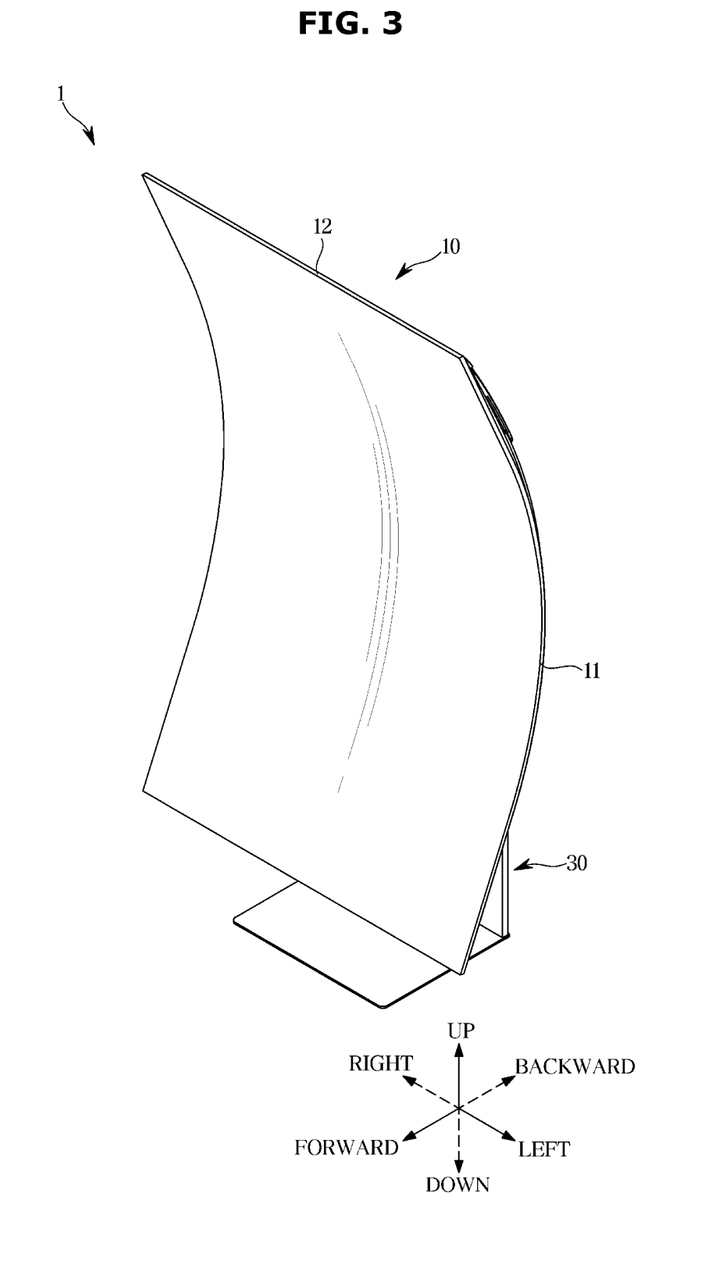
FIG. 3 is a perspective view illustrating a display apparatus according to an embodiment.

FIG. 1 is a perspective view illustrating a display apparatus according to an embodiment. As shown in FIG. 1, a display module may be laterally disposed. FIG. 2 is a rear perspective view illustrating the display apparatus shown in FIG. 1. FIG. 3 is a perspective view illustrating a display apparatus according to an embodiment, which shows a state in which a display module is longitudinally disposed.

A display module 10 is a device capable of processing an image signal and visually displaying a processed image. The processed image may include information, reference materials, data, and the like as characters, figures, graphs, images, and the like. The display module 10 may include a television, a monitor, and the like.

The display module 10 may be configured to display a screen. The display module 10 may include a self-emissive display panel, such as an organic light-emitting diode (OLED), or a non-emissive display panel, such as a liquid crystal display (LCD). There is no particular limitation on the type of the display panel.

The display module 10 may be provided so that the length of a lateral side and the length of a longitudinal side are different from each other. That is, the display module 10 may be provided to have a long side 11 and a short side 12. The display module 10 may be provided in a rectangular plate shape. In addition, as shown in FIGS. 1 to 3, the display module 10 may be provided as a curved display in which the long side 11 is formed in a rounded shape. Alternatively, the display module 10 may be provided as a flat display in which the long side 11 is provided as a straight line.

According to an embodiment, the display apparatus 1 may include a display module 10 and support devices 20, 100, and 30 supporting the display module 10.

The support devices 20, 100, and 30 may include a support bracket 20, a support arm 100, and a support stand 30.

Referring to FIG. 2, the support bracket 20 may be coupled to a rear side of the display module 10. The support arm 100 may be coupled to the support bracket 20 to support the display module 10. The support arm 100 may support the display module 10 such that the display module 10 may pivot. The support arm 100 may be coupled to the support stand 30 to be movable in an up direction and a down direction (i.e., along a vertical direction) within a predetermined range.

Referring to FIGS. 1 and 3, the display module 10 may be positioned in any one of a first orientation in which the long side 11 is laterally disposed and a second orientation in which the long side 11 is longitudinally disposed. The display module 10 may be positioned in the second orientation by pivot-rotating from the first orientation, and may be positioned in the first orientation by pivot-rotating from the second orientation. Hereinafter, "pivot rotation" may be expressed as "rotation".

The support arm 100 may support the support bracket 20 and the display module 10 coupled to the support bracket 20 for rotation between the first orientation and the second orientation. The first orientation may be referred to as a landscape orientation, and the second orientation may be referred to as a portrait orientation.

The support arm 100 may be coupled to the support stand 30 to be movable upward and downward from a lowermost end of the support stand 30 to an uppermost end of the support stand 30. As the support arm 100 moves upward and downward with respect to the support stand 30, the support bracket 20 and the display module 10 coupled to the support arm 100 may be moved upward and downward with respect to the support stand 30.

When the support arm 100 is positioned at the lowermost end of the support stand 30, the display module 10 arranged in the landscape orientation may not be sufficiently spaced apart from a floor surface in the upper and lower side direction, and a corner portion of the display module 10 may collide with the floor surface, causing the display module 10 to be damaged. The "floor surface" may refer to a physical space in which the support stand 30 is placed. The "floor surface" may refer to some area on a desk, regardless of its name.

In related devices, in order to prevent collision with the floor surface during a rotation of the display module, the user needs to position the display module at the uppermost end of the support stand and then rotate the display module. However, when the user inadvertently rotates the display module without positioning the display module at the uppermost end of the support stand, the display module may collide with the floor surface, so that the display module is damaged as described above.

According to an embodiment, the display module 10 may be prevented from colliding with the floor surface due to the rotation thereof. Specifically, the display module 10 may be provided to be rotatable with respect to the support devices 20, 100, and 30 only when the display module 10 is spaced apart from the floor surface by a distance greater than or equal to a predetermined distance, thereby preventing the display module 10 from colliding with the floor surface.

According to an embodiment, the rotation of the display module 10 may be restricted when the display module 10 is spaced apart from the floor surface by a distance less than the predetermined distance, and is likely to collide with the floor surface due to the rotation thereof. The rotation of the display module 10 may be allowed at a position in which the display module 10 is unlikely to collide with the floor surface even by a rotation thereof. Accordingly, when the display module 10 is in a rotatable state, the display module 10 may not collide with the floor surface.

Figure 4:
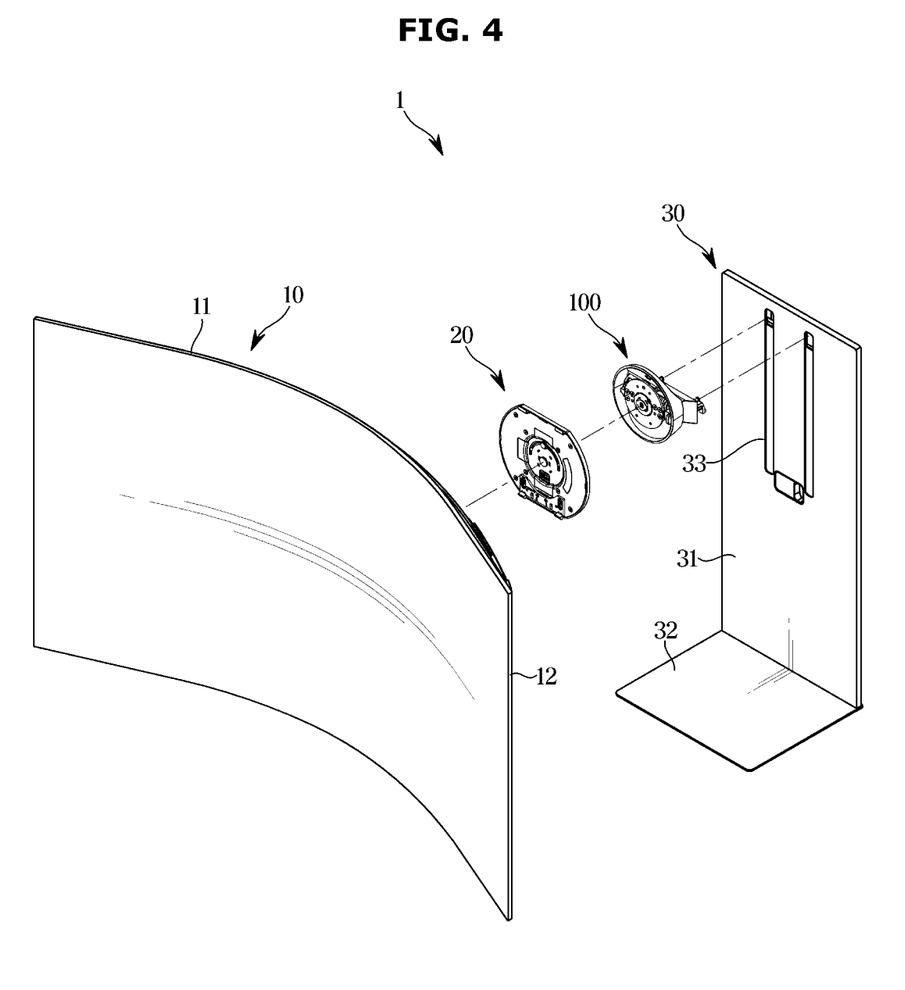
FIG. 4 is a front exploded perspective view illustrating a display apparatus according to an embodiment.
Figure 5:
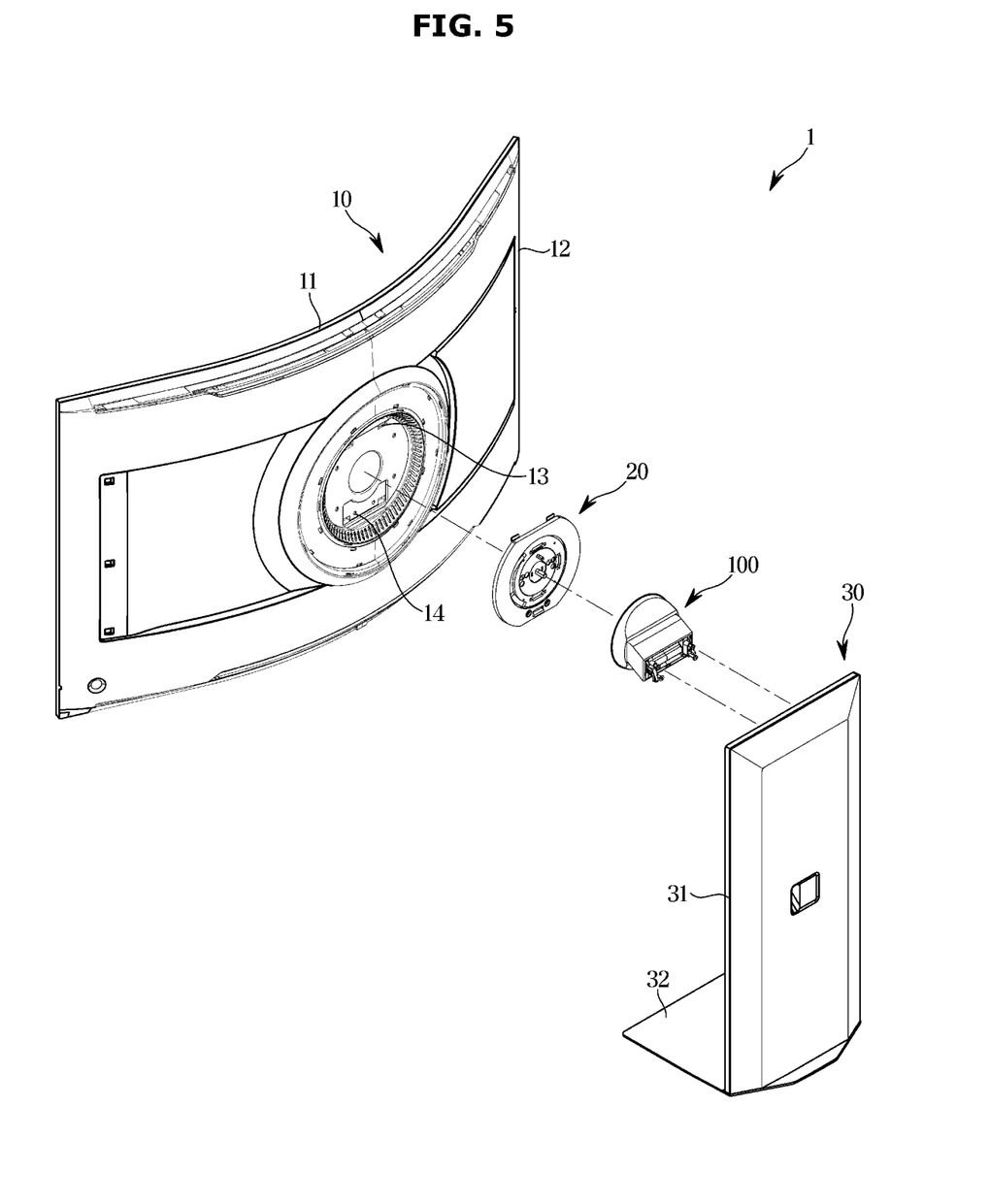
FIG. 5 is a rear exploded perspective view illustrating a display apparatus according to an embodiment.

FIG. 4 is a front exploded perspective view illustrating a display apparatus according to an embodiment. FIG. 5 is a rear exploded perspective view illustrating a display apparatus according to an embodiment.

Referring to FIGS. 4 and 5, the display apparatus 1 may include the display module 10 and the support devices 20, 100, and 30 for supporting the display module 10 to be rotatable and vertically movable.

The display module 10 may include an upper groove 13 and a lower groove 14 provided on a rear surface thereof.

The support devices 20, 100, and 30 include the support bracket 20 provided to be coupled to the rear surface of the display module 10, the support arm 100 coupled to the support bracket 20 and rotatably supporting the support bracket 20, and the support stand 30 coupled to the support arm 100 and supporting the support arm 100 to enable a upward and downward movement.

The support bracket 20 may be coupled to the rear surface of the display module 10 with an upper protrusion 21a and a lower protrusion 22a, which will be described below, being inserted into the upper groove 13 and lower groove 14 of the display module 10, respectively. The support bracket 20 may be coupled to the rear surface of the display module 10 without a separate fastener.

The support bracket 20 may be provided to be coupled to the display module 10 and the support arm 100. The support bracket 20 may be coupled to the display module 10 with the support arm 100 coupled thereto.

The support arm 100 may rotatably support the support bracket 20. The support arm 100 may rotatably support the support bracket 20 to thereby rotatably support the display module 10 coupled to the support bracket 20.

The support stand 30 may be provided to stand on the floor surface by itself. The support stand 30 may include a stand plate 32 provided to be in contact with the floor surface and a stand body 31 coupled to the support arm 100.

The stand body 31 may include a stand rail 33. The stand rail 33 may guide an upward and downward movement of the support arm 100 with respect to the stand body 31.

Figure 6:
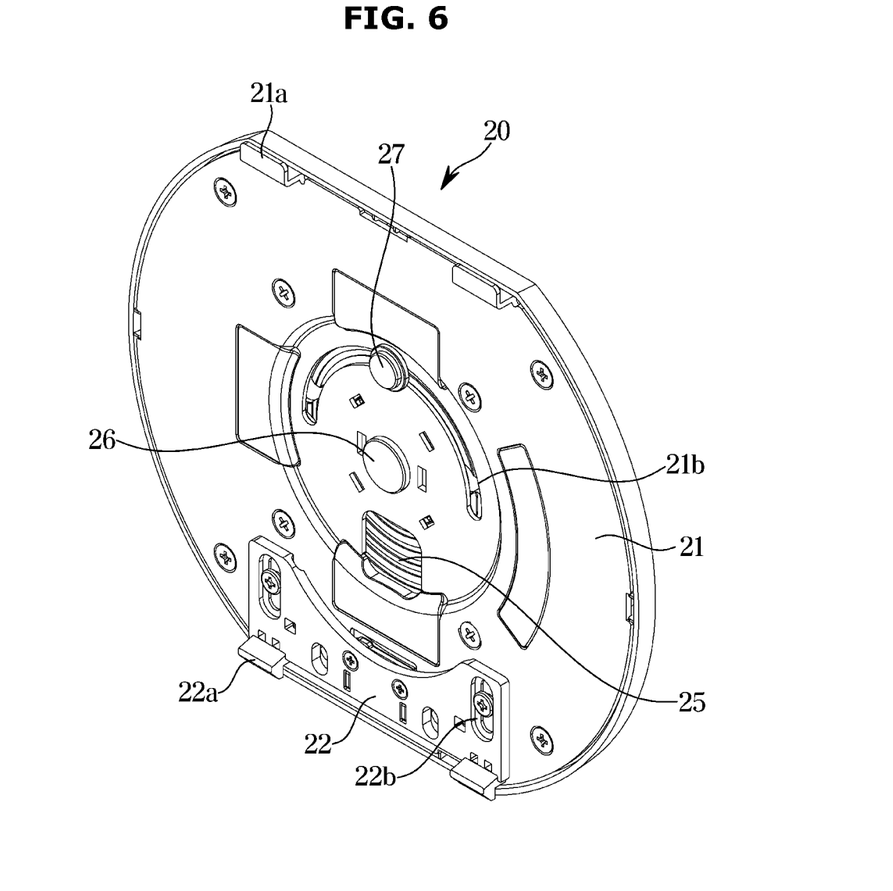
FIG. 6 is a view illustrating a support bracket of a display apparatus according to an embodiment.
Figure 7:
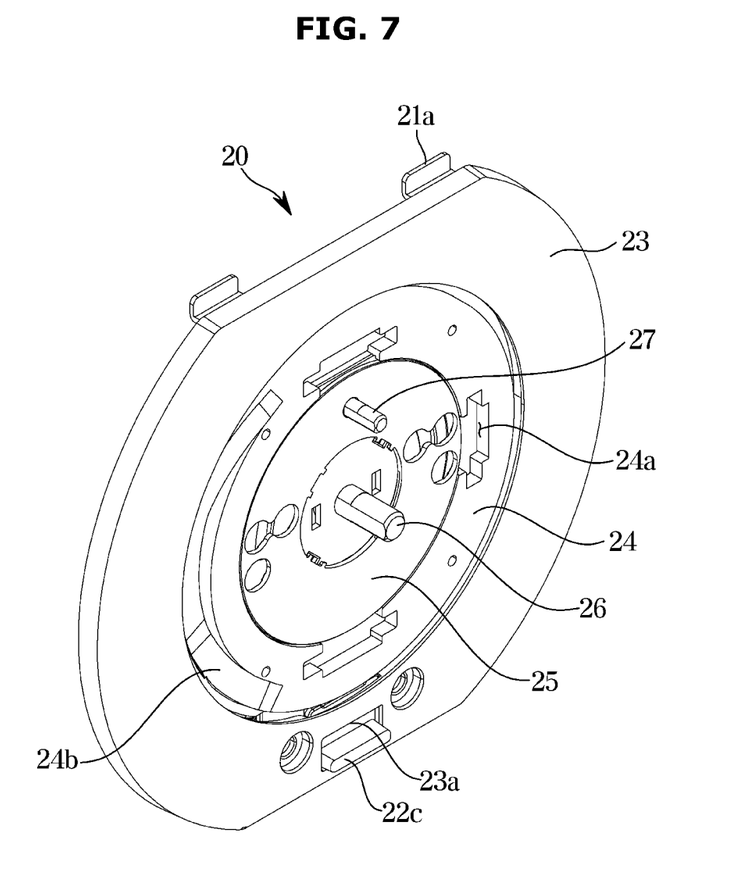
FIG. 7 is a view illustrating the support bracket shown in FIG. 6 according to an embodiment.

FIGS. 6 and 7 are views illustrating a support bracket of a display apparatus according to an embodiment.

Hereinafter, the support bracket 20 according to an embodiment will be described in detail with reference to FIGS. 6 and 7.

Referring to FIGS. 6 and 7, the support bracket 20 includes the upper protrusion 21a and the lower protrusion 22a provided to be respectively inserted into the upper groove 13 and the lower groove 14 of the display module 10. The support bracket 20 may include a moving bracket 22 that is provided to be movable upward and downward, with respect to the upper protrusion 21a, and includes the lower protrusion 22a. The moving bracket 22 may be provided to be movable upward and downward within a predetermined range, and may be elastically biased downward by an elastic member, such as an elastic band or an elastic cord, or by a spring.

According to an embodiment, the support bracket 20 may include a rotating bracket 21 provided to rotate together with the display module 10 and including the upper protrusion 21a, a moving bracket 22 coupled to be movable upward and downward with respect to the rotating bracket 21 and including the lower protrusion 22a, a guide bracket 24 coupled to the rotating bracket 21 to rotate together with the rotating bracket 21, a bracket cover 23 coupled to a rear surface of the rotating bracket 21, and a fixed bracket 25 coupled to the support arm 100 so as not to rotate together with the display module 10. In this regard, the rotating bracket 21 may rotate with respect to the fixed bracket 25.

The rotating bracket 21 may include the upper protrusion 21a provided on the upper end thereof. In addition, the rotating bracket 21 may include a guide hole 21b into which a second fixing member 27 to be described below is inserted. The guide hole 21b may be provided in an arc shape so that the second fixing member 27 may be fixed at a predetermined position even when the rotating bracket 21 rotates.

The moving bracket 22 may be coupled to a lower end of the rotating bracket 21. The moving bracket 22 may be coupled to the rotating bracket 21 to be movable upward and downward with respect to the rotating bracket 21. The moving bracket 22 may be elastically biased downward by an elastic member, such as an elastic band or an elastic cord, or by a spring. The moving bracket 22 may include a lower protrusion 22a and a coupling hole 22b through which a coupling member for coupling the moving bracket 22 and the rotating bracket 21 passes. The coupling member may move upward and downward within the coupling hole 22b. The coupling hole 22b may limit the range of the upward and downward movement of the coupling member, and by limiting the upward and downward movement range of the coupling member, the upward and downward movement range of the moving bracket 22 may be limited. In addition, the moving bracket 22 may include a rear protrusion 22c protruding rearward of the support bracket 20.

The rear protrusion 22c may move upward and downward within a cover hole 23a of the bracket cover 23. Similar to the coupling hole 22b, the cover hole 23a may limit the range of upward and downward movement of the rear protrusion 22c. As the cover hole 23a limits the upward and downward movement range of the rear protrusion 22c, the upward and downward movement range of the moving bracket 22 may be limited. The upward and downward movement range of the moving bracket 22 may be limited by a hole having a smaller upward and downward movement range between the coupling hole 22b and the cover hole 23a.

The user may insert the upper protrusion 21a into the upper groove 13, position the lower protrusion 22a to correspond to the lower groove 14, and then grasp the rear protrusion 22c to move the rear protrusion 22c upward, so that the support bracket 20 is coupled to the rear surface of the display module 10. As the rear protrusion 22c is moved upward, the support bracket 20 may be inserted into a bracket groove provided on the rear surface of the display module 10. When the user releases the rear protrusion 22c with the support bracket 20 being inserted into the bracket groove, the moving bracket 22 may be moved downward by the elastic force of the elastic member, and the lower protrusion 22a may be inserted into the lower groove 14. As the upper protrusion 21a is inserted into the upper groove 13 and the lower protrusion 22a is inserted into the lower groove 14, the support bracket 20 may be coupled to the rear surface of the display module 10.

The guide bracket 24 may rotate together with the rotating bracket 21 and the bracket cover 23. The guide bracket 24 may rotate together with the display module 10. The guide bracket 24 may include a locking groove 24a. The locking groove 24a will be described below. In addition, the guide bracket 24 may further include a link guide portion 24b.

The fixed bracket 25 may be provided to not rotate with respect to the support stand 30, even when the display module 10 rotates. The fixed bracket 25 may be coupled to the support arm 100. As the fixed bracket 25 is coupled to the support arm 100, the support bracket 20 and the support arm 100 may be coupled to each other.

A first fixing member 26 and a second fixing member 27 may be provided to couple the rotating bracket 21 and the fixed bracket 25, respectively. The first fixing member 26 and the second fixing member 27 may be provided to pass through the rotating bracket 21 and the fixed bracket 25, respectively.

The first fixing member 26 may pass through a hole provided in the center of the rotating bracket 21. An end portion of the first fixing member 26 having passed through the rotating bracket 21 may be coupled to a first fixing head 26a. The first fixing head 26a may have a diameter larger than that of the hole so as not to pass through the hole of the rotating bracket 21.

The second fixing member 27 may pass through a guide hole 21b of the rotating bracket 21 and a through hole of the fixed bracket 25. An end portion of the second fixing member 27 protruding to the rear side of the support bracket 20 by passing through the guide hole 21b and the through hole may be coupled to a second fixing head 27a. The second fixing head 27a may have a diameter larger than the width of the guide hole 21b and the size of the through hole so as not to pass through the guide hole 21b and the through hole.

The second fixing member 27 may be located in the guide hole 21b of the rotating bracket 21. Because the guide hole 21b is provided in an arc shape, even when the second fixing member 27 that does not rotate together with the display module 10 is located in the guide hole 21b, the rotating bracket 21 may rotate together the display module 10. In this regard, because the guide hole 21b is provided in an arc-shape, the second fixing member 27 may not restrict the rotation of the rotating bracket 21.

Figure 8:
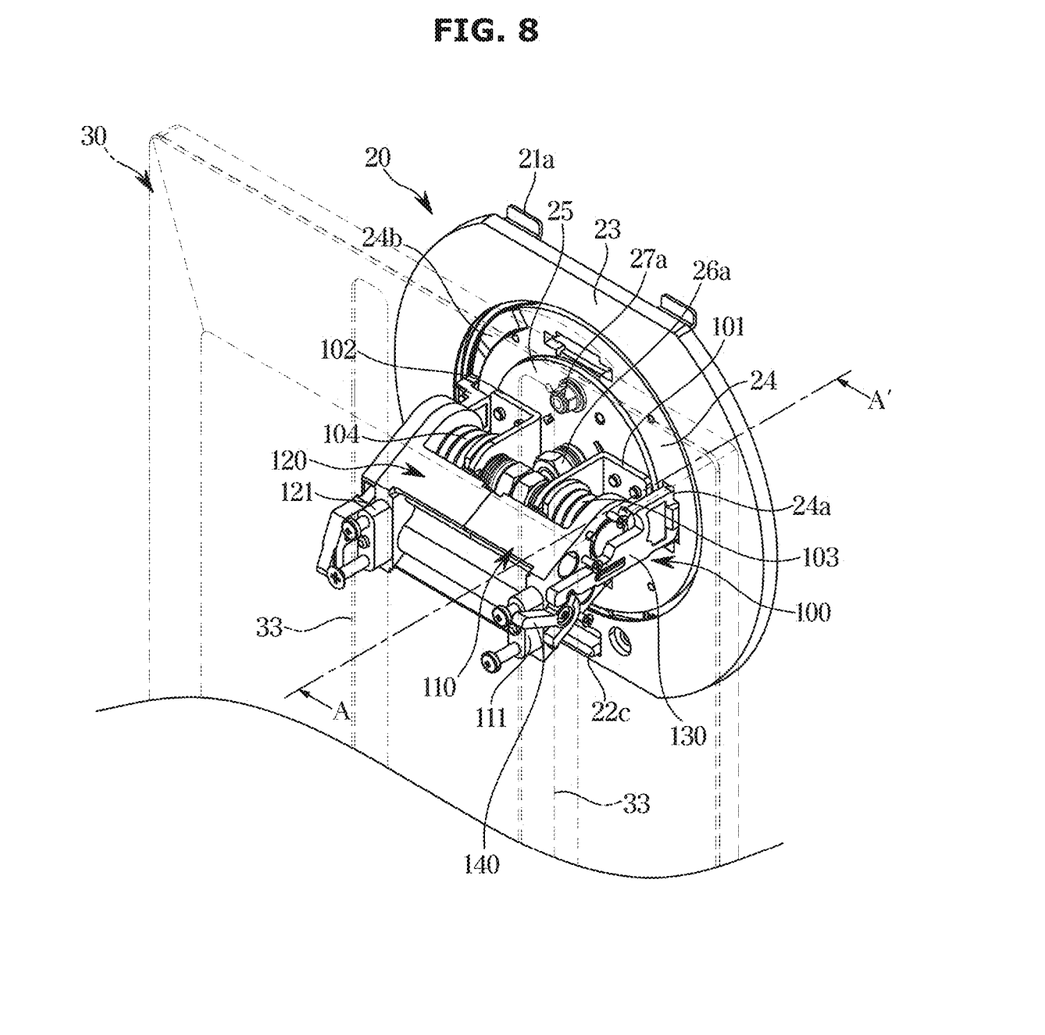
FIG. 8 is a view illustrating an internal structure of a support arm when a pivot rotation of a display module is restricted in a display apparatus according to an embodiment.
Figure 9:
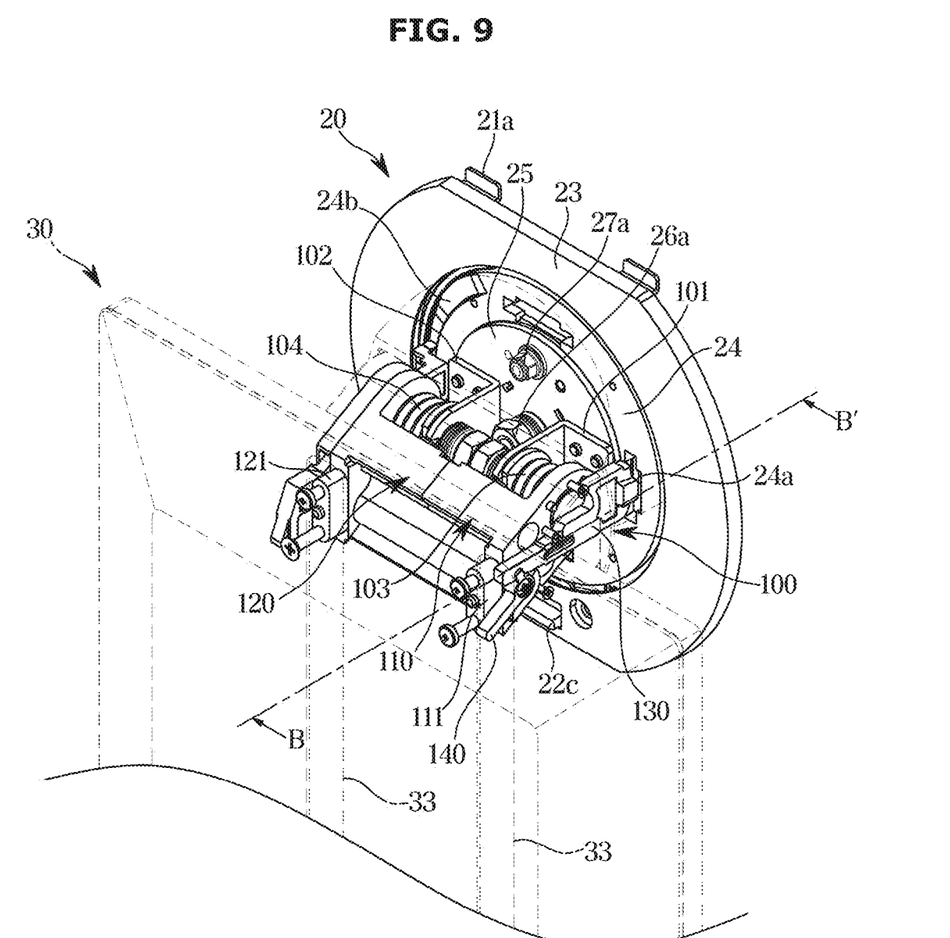
FIG. 9 is a view illustrating an internal structure of a support arm when a pivot rotation of a display module is allowed in a display apparatus according to an embodiment.

FIG. 8 is a view illustrating an internal structure of a support arm when a pivot rotation of a display module is restricted in a display apparatus according to an embodiment. FIG. 9 is a view illustrating an internal structure of a support arm when a pivot rotation of a display module is allowed in a display apparatus according to an embodiment. Hereinafter, the support arm 100 according to the embodiment will be described in detail with reference to FIGS. 8 and 9.

Referring to FIGS. 8 and 9, the support arm 100 may include a first bracket 101 and a second bracket 102 provided to be coupled to the fixed bracket 25. The first bracket 101 and the second bracket 102 may be coupled to the fixed bracket 25 by a fastening member. As the first bracket 101 and the second bracket 102 are coupled to the fixed bracket 25, the support arm 100 and the support bracket 20 may be coupled to each other.

The support arm 100 may include a first fixing link 110 and a second fixing link 120 that are coupled to the support stand 30 to be movable in the upward and downward direction. The first fixing link 110 and the second fixing link 120 may be laterally arranged side by side. The first fixing link 110 and the second fixing link 120 may be coupled to each other by a fastening member.

The first fixing link 110 may include a first rail inserting protrusion 111 that is inserted into the stand rail 33 of the support stand 30 to move upward and downward along the stand rail 33.

The second fixing link 120 may include a second rail inserting protrusion 121 that is inserted into the stand rail 33 of the support stand 30 to move upward and downward along the stand rail 33.

The support arm 100 may include a first spring 103 disposed between the first fixing link 110 and the first bracket 101 and a second spring 104 disposed between the second bracket 102 and the second fixing link 120. The first spring 103 and the second spring 104 may include torsion springs.

The support arm 100 may support the support bracket 20 to be rotatably movable within a predetermined range with respect to a rotation axis extending in a leftward and rightward direction. Such a rotational movement is referred to as a tilt. The support arm 100 may support the support bracket 20 to enable a tilt operation, thereby supporting the display module 10 coupled to the support bracket 20 to enable a tilt operation.

The first spring 103 and the second spring 104 may provide an elastic force such that the display module 10 may be maintained in a fixed state at any position within a tilting range of the display module 10.

The support arm 100 may include a locking link 130 provided to move forward and backward with respect to the first fixing link 110, and a rotating link 140 provided to rotate such that the locking link 130 is moved. The rotating link 140 may also be provided to be rotated by a movement of the locking link 130.

The support bracket 20 may include the locking groove 24a provided on the rear surface thereof. Specifically, the support bracket 20 may include the guide bracket 24 including the locking groove 24a. The guide bracket 24 may be provided to rotate together with the display module 10 during rotation of the display module 10.

According to an embodiment, the locking groove 24a may include three locking grooves to allow for rotation of the support bracket 20 in both directions. The three locking grooves 24a may be spaced apart from each other to correspond with the locking link 130, which will be described below, whenever the support bracket 20 rotates at an interval of 90 degrees. However, embodiments are not restricted thereto, and the locking groove 24a may be provided in one or two grooves.

Referring to FIG. 8, the locking link 130 may be inserted into the locking groove 24a. When the locking link 130 is inserted into the locking groove 24a of the support bracket 20, the rotation of the support bracket 20 may be restricted. In this regard, upon the locking link 130 of the support arm 100 being inserted into the locking groove 24a of the support bracket 20, the rotation of the support bracket 20 and the display module 10 coupled to the support bracket 20 may be restricted.

Referring to FIG. 9, the locking link 130 may be withdrawn from the locking groove 24a by moving backward. When the locking link 130 is withdrawn from the locking groove 24a of the support bracket 20, the rotation of the support bracket 20 may be allowed. In this regard, upon the locking link 130 of the support arm 100 being withdrawn from the locking groove 24a of the support bracket 20, the rotation of the support bracket 20 and the display module 10 coupled to the support bracket 20 may be allowed. When the locking link 130 is withdrawn from the locking groove 24a, the rotation restriction of the support bracket 20 may be released.

Figure 10:
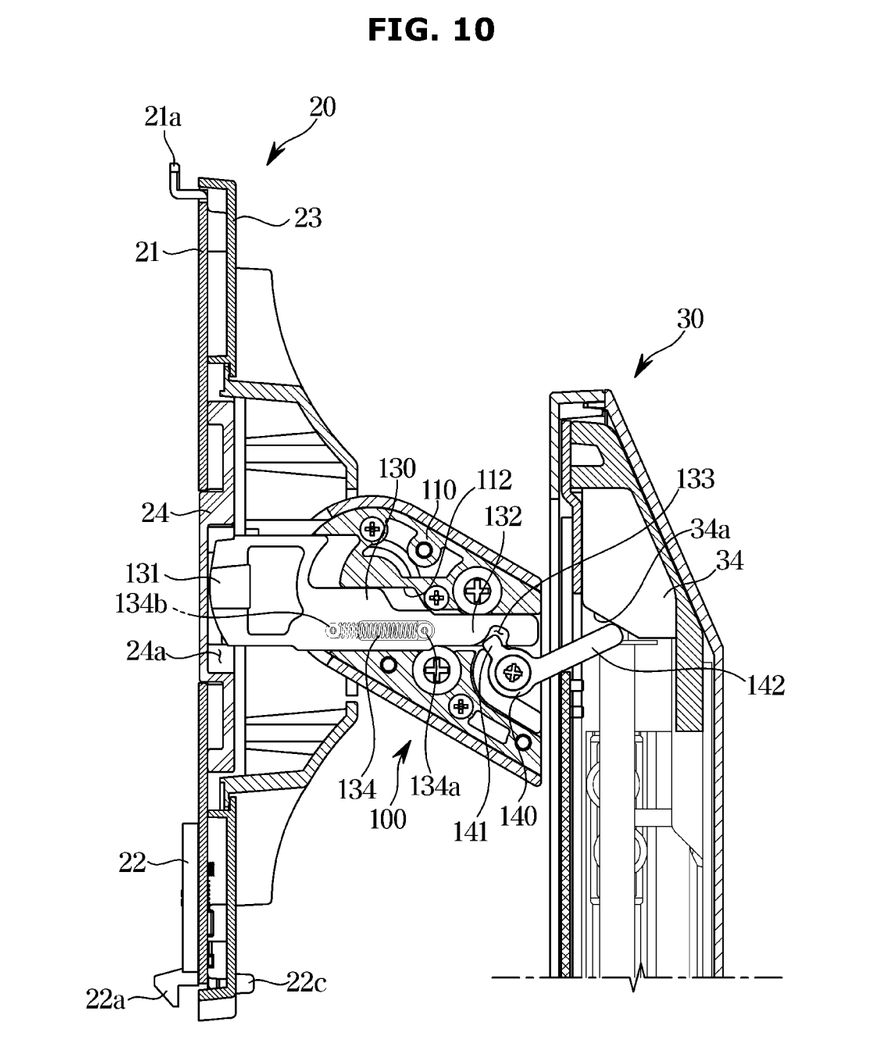
FIG. 10 is a cross-sectional view taken along line A-A' of FIG. 8 according to an embodiment.
Figure 11:
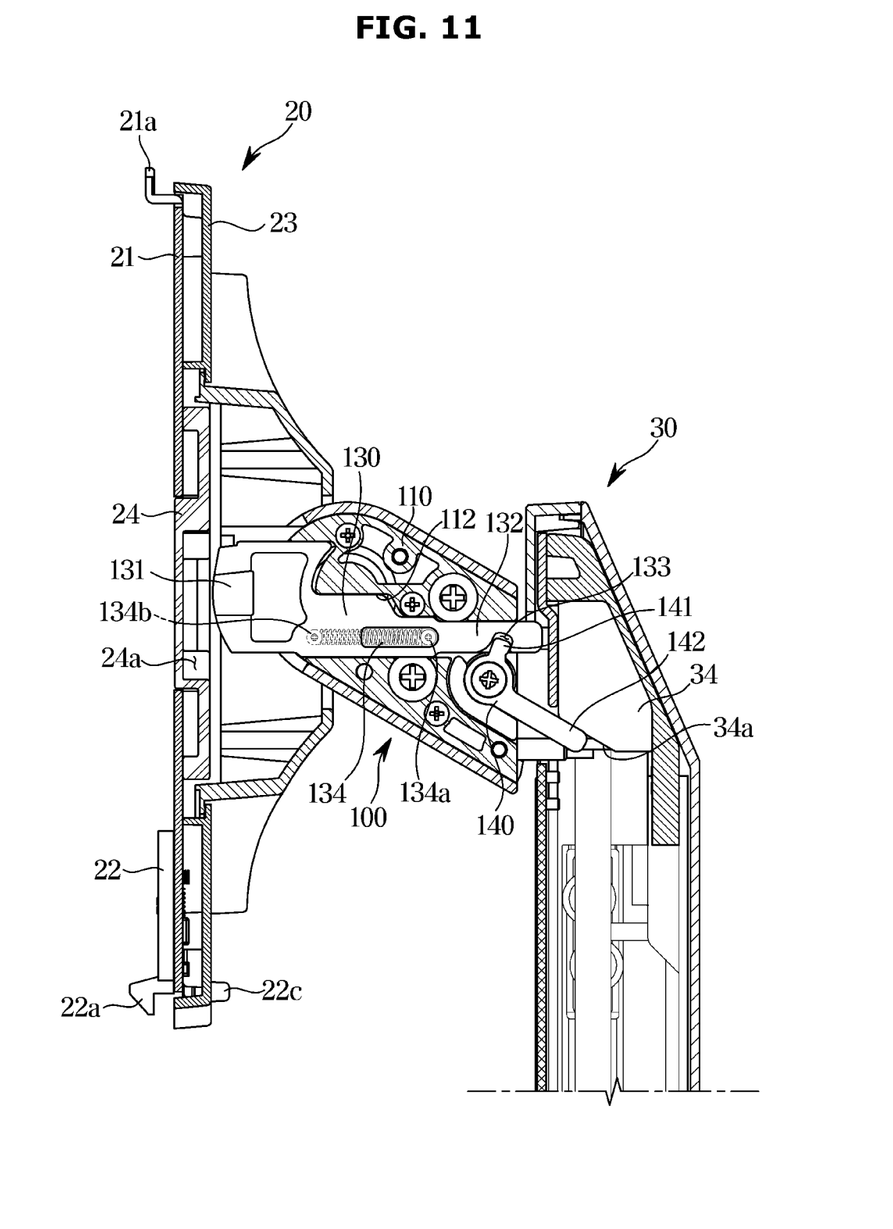
FIG. 11 is a cross-sectional view taken along line B-B' of FIG. 9 according to an embodiment.

FIG. 10 is a cross-sectional view taken along line A-A' of FIG. 8. FIG. 11 is a cross-sectional view taken along line B-B' of FIG. 9.

Hereinafter, a locking mechanism of the support arm 100 and the support bracket 20 according to an embodiment will be described in detail with reference to FIGS. 10 and 11.

Referring to FIG. 10, in a state in which the support arm 100 is not positioned at the maximum height with respect to the support stand 30, the locking link 130 may be inserted into the locking groove 24a.

The locking link 130 may include a locking portion 131 inserted into or withdrawn from the locking groove 24a, an extension portion 132 extending rearward of the locking portion 131, and an insertion groove 133 formed in the extension portion 132.

The first fixing link 110 may include a guide groove 112 for guiding the forward and backward movement of the locking link 130. The locking link 130 may move forward and backward within the guide groove 112.

The support arm 100 may include an elastic member 134, such as an elastic band or an elastic cord, or by a spring, for providing an elastic force such that the locking link 130 is moved forward with respect to the first fixing link 110. The elastic member 134 may elastically bias the locking link 130 to be moved forward. For the locking link 130 to be moved forward (e.g., away from the support stand 30 and towards the support bracket 20) by the elastic force of the elastic member 134, one end 134a of the elastic member 134 may be connected to the locking link 130, and the other end 134b of the elastic member 134 may be connected to the first fixing link 110.

According to an embodiment, upon the locking portion 131 being inserted into the locking groove 24a, the distance between the one end 134a of the elastic member 134 and the other end 134b of the elastic member 134 may have a minimum distance. Upon the locking portion 131 being withdrawn from the locking groove 24a, the distance between the one end 134a of the elastic member 134 and the other end 134b of the elastic member 134 may be increased. The elastic member 134 may provide an elastic force such that the distance between the one end 134a and the other end 134b is shortened. The elastic member 134 may include a tension spring.

The rotating link 140 may include an inserting protrusion 141 provided to be inserted into the insertion groove 133 of the locking link 130 and an extension protrusion 142 extending to the inner side of the support stand 30. The inserting protrusion 141 and the extension protrusion 142 may be integrally formed with each other to rotate together. The inserting protrusion 141 and the extension protrusion 142 may extend in different directions. The inserting protrusion 141 may be provided shorter than the extension protrusion 142.

The support stand 30 may include a rotation guide portion 34 provided on the inner upper side thereof. The rotation guide portion 34 may be provided to guide the rotation of the rotating link 140. The rotation guide portion 34 may be disposed adjacent to the upper end of the support stand 30. The rotation guide portion 34 may include a rotation guide surface 34a provided to be in contact with the rotating link 140. The rotation guide surface 34a may be formed to be oblique at a predetermined angle with respect to the horizontal direction.

Referring to FIG. 10, in a state in which the support arm 100 is not positioned at the uppermost end of the support stand 30, the rotating link 140 may not be in contact with the rotation guide portion 34 of the support stand 30. In addition, the locking portion 131 of the locking link 130 may be inserted into the locking groove 24a. The support arm 100 may be movable downward with the locking portion 131 being inserted into the locking groove 24a.

Referring to FIG. 11, in a state in which the support arm 100 is positioned at the uppermost end of the support stand 30, the rotating link 140 may be in contact with the rotation guide portion 34 of the support stand 30. In addition, the locking portion 131 of the locking link 130 may be withdrawn from the locking groove 24a. Because the support arm 100 is positioned at the uppermost end of the support stand 30, upward movement of the support arm 100 may be restricted.

Referring to FIGS. 10 and 11, when the support arm 100 moves upward to the uppermost end of the support stand 30, the extension protrusion 142 of the rotating link 140 contacts the rotation guide surface 34a of the support stand 30. When the support arm 100 moves upward while the extension protrusion 142 is in contact with the rotation guide surface 34a, the extension protrusion 142 is rotated in a first direction by the rotation guide surface 34a. The first direction may indicate a clockwise direction with reference to FIGS. 10 and 11.

The extension protrusion 142 may be rotated until the extension protrusion 142 is arranged in parallel to the rotation guide surface 34a. In this regard, the extension protrusion 142 may be rotated until a first angle at which the extension protrusion 142 is inclined with respect to the horizontal direction is equal to a second angle at which the rotation guide surface 34a is inclined with respect to the horizontal direction.

When the extension protrusion 142 is rotated a predetermined angle by the rotation guide surface 34a, the inserting protrusion 141 may be rotated the predetermined angle together with the extension protrusion 142. When the inserting protrusion 141, while being inserted into the insertion groove 133, rotates in the first direction, the locking link 130 may be moved backward (e.g., toward the support stand 30 and away from the support bracket 20). That is, when the rotating link 140 rotates in the first direction, the locking link 130 may be moved backward. When the rotational force of the rotating link 140 is greater than the elastic force of the elastic member 134, the locking link 130 may be moved backward.

When the locking link 130 is moved backward, the locking portion 131 may be withdrawn from the locking groove 24a. When the locking portion 131 is withdrawn from the locking groove 24a, the rotation of the support bracket 20 with respect to the support arm 100 is not restricted.

According to an embodiment, when the support arm 100 is positioned at the uppermost end of the support stand 30, the locking link 130 may be moved backward and the rotation of the support bracket 20 may be allowed. When the rotation of the support bracket 20 is allowed, the rotation of the display module 10 coupled to the support bracket 20 may be allowed.

When the display module 10 is positioned at the maximum height of the support stand 30, the display module 10 may not collide with the floor surface even with a rotation of the display module 10 arranged in a landscape orientation. Because the display module 10 is sufficiently spaced apart from the floor surface, the display module 10 may not collide with the floor surface even when the display module 10 rotates.

When the display module 10 is moved downward from the maximum height of the support stand 30, the locking link 130 may be moved forward by the elastic force of the elastic member 134 and thus inserted into the locking groove 24a. Together with the forward movement of the locking link 130, the insertion groove 133 is moved forward to rotate the inserting protrusion 141 in a second direction opposite to the first direction. When the support arm 100 moves downward, the rotating link 140 may be separated from the rotation guide portion 34.

According to one or more embodiments, a display apparatus capable of preventing a display module from colliding with a floor surface due to being pivotally rotated can be provided.

According to one or more embodiments, a display apparatus in which a display module is provided to perform a pivot rotation with respect to a support device only when the display module is spaced apart from the floor surface by a predetermined distance or more can be provided.

According to one or more embodiments, a display apparatus in which rotation of a display module is restricted at a position having a possibility of colliding with a floor surface due to being rotated can be provided.

Although aspects of embodiments have been shown and described, it will be appreciated by those skilled in the art that changes and modifications may be made without departing from the principles and scope of the disclosure, the scope of which is defined in the claims and their equivalents.

What is claimed is:

1. A display apparatus comprising:
   a display panel;
   a support bracket coupled to a rear surface of the display panel and including a locking groove, the support bracket being configured to rotate between a first orientation in which a long side of the display panel is laterally disposed and a second orientation in which the long side of the display panel is longitudinally disposed;
   a support arm coupled to the support bracket and supporting the display panel; and
   a support stand supporting the support arm and configured to allow the support arm to move along a vertical direction between a first position and a second position lower than the first position,
   wherein the support arm comprises:
      a rotating link configured to rotate in a first direction as the support arm moves from the second position to the first position, wherein the rotating link comprises a first protrusion; and
      a locking link configured to move from a locked position in which the locking link is inserted into the locking groove to restrict rotation of the display panel, to an unlocked position in which the locking link is withdrawn from the locking groove to allow rotation of the display panel, based on the rotating link rotating in the first direction, wherein the locking link defines an insertion groove which accommodates the first protrusion and moves along a horizontal direction as the locking link moves from the locked position to the unlocked position.

2. The display apparatus of claim 1, wherein the support arm further comprises a fixing link coupled to the support stand, and wherein the insertion groove moves along the horizontal direction with respect to the fixing link.

3. The display apparatus of claim 2, wherein the locking link is further configured to be inserted into the locking groove by moving toward the support bracket, and to be withdrawn from the locking groove by moving away from the support bracket.

4. The display apparatus of claim 2, wherein the support arm further comprises an elastic member configured to bias the locking link toward the support bracket.

5. The display apparatus of claim 4, wherein a first end of the elastic member is connected to the fixing link, and a second end of the elastic member is connected to the locking link.

6. The display apparatus of claim 4, wherein the locking link is further configured to move to the locked position based on an elastic force of the elastic member when the support arm moves from the first position to the second position.

7. The display apparatus of claim 6, wherein the rotating link is further configured to rotate in a second direction opposite to the first direction based on the locking link moving from the unlocked position to the locked position.

8. The display apparatus of claim 4, wherein the locking link comprises:
 a locking portion configured to extend be inserted into the locking groove or withdrawn from the locking groove; and
 an extension portion extending toward the support stand and including the insertion groove.

9. The display apparatus of claim 8, wherein the rotating link
 further comprises a second protrusion extending into the support stand and configured to rotate together with the first protrusion.

10. The display apparatus of claim 9, wherein the support stand comprises a rotation guide portion configured to contact the second protrusion and rotate the rotating link in the first direction as the support arm moves from the second position to the first position.

11. The display apparatus of claim 10, wherein the rotation guide portion is provided adjacent to an upper end of the support stand.

12. The display apparatus of claim 10, wherein the rotation guide portion comprises a rotation guide surface provided at an angle oblique to the horizontal direction, and
 wherein the rotation guide surface is configured to guide the second protrusion such that the second protrusion rotates in the first direction to be arranged in parallel with the rotation guide surface.

13. The display apparatus of claim 1, wherein the support bracket is detachably coupled to the rear surface of the display panel.

14. A display stand comprising:
 a support bracket having a locking groove formed therein, and configured to support a display panel and rotate between a first orientation and a second orientation;
 a support arm configured to support the support bracket; and
 a support stand configured to slidably support the support arm between a first position and a second position lower than the first position along a vertical direction,
 wherein the support arm comprises:
  a rotating link configured to rotate in a first direction as the support arm moves from the second position to the first position, wherein the rotating link comprises a first protrusion; and
  a locking link configured to move from a locked position in which the locking link is inserted into the locking groove to restrict rotation of the display panel, to an unlocked position in which the locking link is withdrawn from the locking groove to allow rotation of the display panel, based on the rotating link rotating in the first direction, wherein the locking link defines an insertion groove which accommodates the first protrusion and moves along a horizontal direction as the locking link moves from the locked position to the unlocked position.

15. The display stand of claim 14, wherein the support arm is configured to move in the vertical direction between the first position and the second position, and
 wherein the horizontal direction is perpendicular to the vertical direction.

16. The display stand of claim 15, wherein the locking groove is aligned with the locking link based on the support bracket being in the first orientation, and
 wherein another locking groove is formed in the support bracket and is aligned with the locking link based on the support bracket being in the second orientation.

17. The display stand of claim 16, wherein the support arm further comprises a fixed portion, and
 wherein the locking link is further configured to slide along the fixed portion in the horizontal direction.

18. The display stand of claim 17, further comprising a spring connected between the fixed portion and the locking link, and configured to bias the locking link to the locked position.

19. A method of limiting rotation of a support bracket that is slidable along a support stand between a first position and a second position lower than the first position along a vertical direction, the method comprising:
 restricting rotation of the support bracket based on the support bracket being at the second position;
 sliding the support bracket from the second position to the first position;
 rotating a rotating link in a first direction as the support bracket moves to the first position, wherein the rotating link comprises a first protrusion;
 withdrawing a locking link from a locking groove formed in the support bracket based on the support bracket sliding from the second position to the first position, wherein the locking link defines an insertion groove which accommodates the first protrusion and moves along a horizontal direction as the locking link is withdrawn from the locking groove.

20. The method of claim 19,
 wherein the rotating the rotating link in the first direction moves the locking link.

* * * * *